Jan. 19, 1932.   G. MAHER   1,841,542
AUTOMATIC STATION
Filed May 23, 1929   2 Sheets-Sheet 1

INVENTOR
George Maher
BY
[signature]
ATTORNEY

Jan. 19, 1932.  G. MAHER  1,841,542
AUTOMATIC STATION
Filed May 23, 1929   2 Sheets-Sheet 2

INVENTOR
George Maher
BY
ATTORNEY

Patented Jan. 19, 1932

1,841,542

UNITED STATES PATENT OFFICE

GEORGE MAHER, OF BRAINTREE, MASSACHUSETTS

AUTOMATIC STATION

Application filed May 23, 1929. Serial No. 365,309.

My invention relates to automatic stations and, in particular, to automatic stations including synchronous converters, motor-generators or other similar translating devices.

It is the principal object of my invention to provide a synchronous-speed relay for use in connection with starting systems for synchronous converters and the like.

Numerous automatic starting systems have been suggested heretofore for apparatus of the types mentioned but, so far as I am aware, no successful synchronous-speed relay has yet been proposed. One of the functions of the synchronous-speed relay, of course, is to connect a source of biasing excitation current to the field-magnet winding of the translating device, e. g., a synchronous converter. The usual practice in starting rotary converters is to apply low voltage to the armature winding, the field-magnet winding being connected across the direct-current brushes, and permit the converter to start as an induction motor. When the converter reaches synchronous speed, it is desired to connect the field-magnet winding to a source of "flashing" current and also to transfer the armature from starting to running voltage.

It is well known that, so long as a converter rotates below synchronous speed, an alternating voltage is induced in the field-magnet winding having a frequency proportional to the difference between the electrical speed of the armature and that of the revolving field which causes it to rotate. A similar voltage is induced in the armature winding itself but, because of the smaller number of turns therein, the voltage induced in the armature winding is considerably less than that induced in the field-magnet winding.

The synchronous-speed relay of my invention depends for its operation upon the principle that the voltage induced in the field-magnet winding falls to zero when the converter reaches synchronous speed and, furthermore, the voltage of the armature winding, which appears at the direct-current brushes, becomes uni-directional instead of alternating.

In accordance with my invention, I propose to use a two-winding relay to indicate when a converter reaches synchronous speed. One of the windings of said relay, I connect to the direct-current brushes of the converter. The other winding of the relay, I so connect across a portion of the field-magnet winding circuit as to be affected by the voltage drop therein. Because of the transformer action between the armature and field-magnet windings, the phase angle between the voltages induced in said windings will be approximately 180°, i. e., the voltages will be opposing each other. The connections to the relay winding are so made that the second winding will be subject to substantially the same value of voltage as the first, and the relay therefore, remains inoperative so long as its windings are energized by current of opposite polarity or so long as the converter runs below synchronous speed.

When the converter reaches synchronous speed, however, the voltage induced in the field-magnet winding decreases to zero, and the voltage of the armature winding becomes uni-directional. The first relay winding, which is connected across the direct-current brushes of the converter, is subject to the full terminal voltage of the machine. The voltage across the second winding is now only a small percentage of the terminal voltage which is applied to the entire field-magnet-winding circuit but is of such polarity as to assist the current flowing in the first winding to operate the relay. The relay is thus prevented from operating while the converter rotates at sub-synchronous speeds but is positively operated as soon as synchronous speed is reached. Although the connections described above have been found satisfactory in operation, it is apparent that numerous modifications thereof may be made.

For a further explanation of my invention, reference should be had to the accompanying drawings in which.

Figure 1:
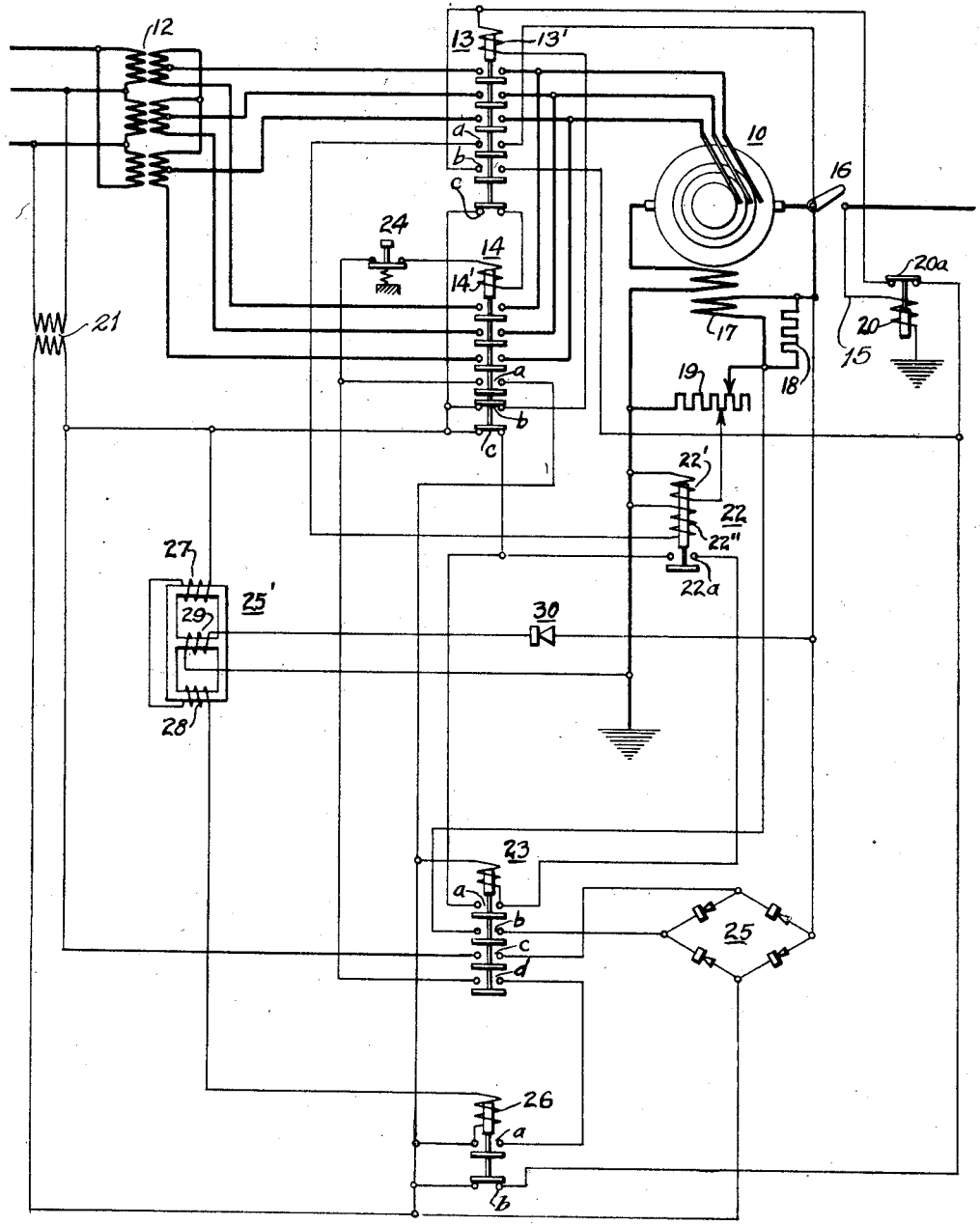
Figure 1 is a diagrammatic view of a complete starting system for a rotary converter embodying the synchronous-speed relay of my invention.
Figure 2:
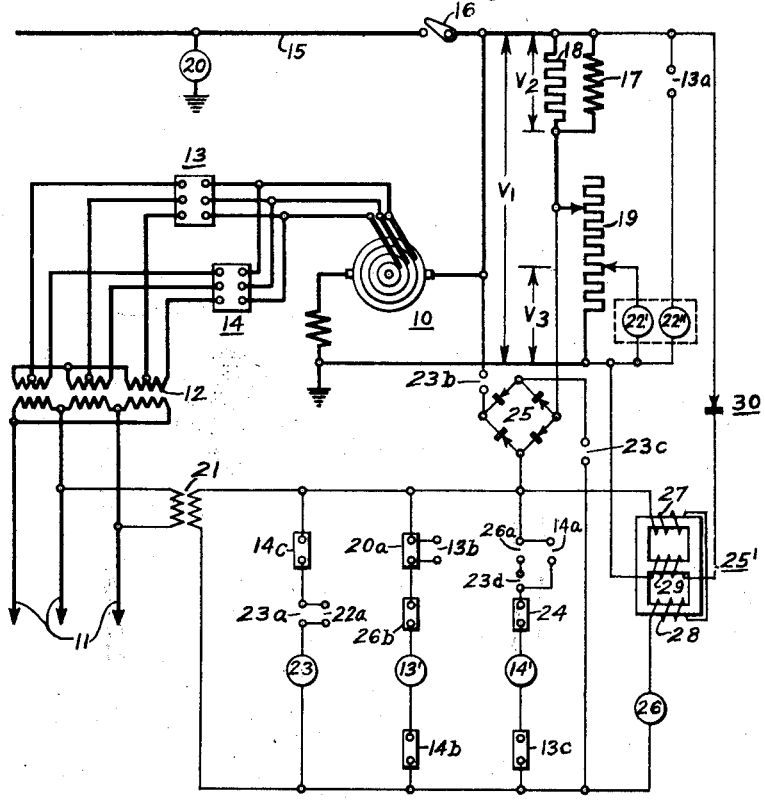
Fig. 2 is a schematic circuit diagram of the starting system shown in Figure 1.

Referring to Figures 1 and 2, the latter of which utilizes well known conventional symbols to avoid the necessity for tracing control circuits to the various devices involved, a synchronous converter 10 is adapted to be supplied with alternating-current energy from a circuit 11, through transformers 12 and starting and running switches 13 and 14. The direct-current brushes of the converter are adapted to be connected, respectively to ground and to a direct-current distribution circuit 15, through a switch 16 which may be automatically operated by any desired means (not shown).

The field-magnet winding of the converter is illustrated at 17 and is permanently shunted by a "field-discharge" resistor 18 of high value. The circuit of the field-magnet winding 17 also includes a rheostat 19.

The various relays and control devices, in addition to those mentioned hereinabove, which are necessary for an operative embodiment of my invention, will be mentioned in the course of the following description of the operation of my invention.

An under-voltage relay 20 shown in its de-energized position is connected to the direct-current circuit 15 so that, when the voltage of the latter decreases, indicating that the connected load has increased, the relay 20 closes its contact 20a to complete a circuit for the operating coil 13' of the starting switch 13. This circuit extends from the upper terminal of a transformer 21, which supplies alternating-current control energy to the contact 20a, through a back contact 26b, to be explained later, the closing coil 13' of the starting switch 13 and a back contact 14b of the running switch 14, to the other terminal of the transformer 21. This interlocking prevents simultaneous closure of the starting and running switches.

When the closing coil 13' is energized, the starting switch 13 and an auxiliary contact 13a are closed. Another auxiliary contact 13b is closed in parallel with the contact 20a of the relay 20. The closing of starting switch 13 connects the armature winding of converter 10 to the low-voltage taps of the transformers 12, and the converter 10 starts to rotate in a well known manner. As described above, an alternating voltage of slip frequency is induced in the field-magnet and armature windings of the converter so long as the machine operates below synchronous speed.

Figure 3:
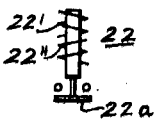
Fig. 3 is a diagrammatic illustration of the synchronous-speed relay.

A relay 22 (see Fig. 3) has a winding 22' connected across a portion of the rheostat 19 in the circuit of the field-magnet winding 17 and a winding 22" connected across the direct-current brushes of the converter when the auxiliary contact 13a of starting switch 13 is closed. As explained above, the voltage induced in the field-magnet winding is much greater, because of the larger number of turns in said winding, than that induced in the armature winding of the converter during starting. It is for this reason that the winding 22' is subjected to only a portion of the voltage induced in the field-magnet winding which causes current to circulate through the rheostat 19 and the armature of the converter, in opposition to the voltage induced in the armature winding itself. The voltage across the converter armature, which is of a polarity opposed to that induced in the field-magnet winding, is applied to the winding 22". The connection of the winding 22' to the rheostat 19 may be adjustable to permit the balancing of the voltages applied to the windings 22' and 22" during starting.

When the converter has reached synchronous speed, the voltage induced in the field-magnet winding decreases to zero, and the voltage induced in the armature winding becomes uni-directional and has a constant value. This will be explained further in connection with Fig. 4. Under these conditions, the winding 22" is still subjected to the voltage across the converter armature. The winding 22' is subjected to only a portion of the voltage across the rheostat 19, but the polarity of the voltage is the reverse of that which was applied to this winding during starting. The reversal of the polarity of the voltage across the field-magnet winding at synchronous speed is explained by the fact that, while the converter operates below synchronous speed, the field-magnet winding, because of the voltage induced therein, serves as a current source and causes current to circulate through the field-magnet and armature windings in series, in opposition to the smaller voltage induced in the armature winding. When the voltage induced in the field-magnet winding decreases to zero as the converter reaches synchronous speed, however, the field-magnet winding circuit acts as a current-consuming device, drawing current from the direct-current brushes of the converter, and the voltage across the circuit is the reverse of the armature voltage. As a result of the consequent reversal of the polarity of the voltage impressed upon the winding 22', the cumulative effect of the windings 22' and 22" is sufficient to cause operation of the relay 22.

When the relay 22 operates, it closes a contact 22a in the circuit of a relay 23 which is connected to the alternating-current control source 21. The relay 23 closes a contact 23a to complete a locking circuit for itself through a back contact 14c of the running switch 14.

Additional contacts 23b and 23c operated by the relay 23 connect the alternating-current terminals of a full-wave rectifier 25 to the terminals of transformer 21 and the direct-current terminals thereof to the terminals of the field-magnet winding 17. I have illustrated the rectifier 25 as of the copper-oxide disc type although any suitable rectifier may be employed.

The function of the rectifier 25, of course, is to supply direct current of a predetermined polarity to the field winding 17 of the converter 10, to insure that the voltage across the direct-current brushes of the converter will be of a predetermined polarity. If the direct-current voltage of the converter builds up with the proper polarity, the voltage of the rectifier 25 will merely supply exciting current to the field-magnet winding, in addition to that supplied by the armature voltage. If the armature voltage develops the incorrect polarity, however, the excitation current supplied to the field-magnet winding, from the rectifier 25, will bias the field-magnet winding so that the converter will slip a pole and build up its voltage with the proper polarity.

When the operations thus far described have taken place, the converter will be running at synchronous speed on starting voltage. It now becomes necessary to transfer the converter armature from low voltage to normal voltage and this transfer is accomplished by means of a reactor 25' and a relay 26. The reactor 25' has alternating-current windings 27 and 28 and a direct-current winding 29 which is connected in series with a half-wave rectifier 30 across the direct-current brushes of the converter 10. As long as the converter is running below synchronous speed, the voltage applied to the circuit including the winding 29 will be alternating, but the rectifier 30 will permit current to flow only in one direction so that the winding 29 will be energized by a series of current impulses of one polarity. Because of the reactance of the winding, however, this impulsing current will be of small magnitude. Under such circumstances, the voltage across the windings 27, 28 of the reactor 25' will be considerable because of their very high reactance.

When the converter reaches synchronous speed, however, a uniform voltage is applied to the circuit including the winding 29 of the reactor 25'. If this voltage is of the proper polarity, the winding 29 will be strongly energized to saturate the core of the reactor 25' and thus reduce the effective reactance of the windings 27, 28. The voltage across these windings is thus reduced and shifted to the winding of the relay 26 to operate the latter. If the polarity of the uniform voltage across the converter brushes is incorrect, the biasing excitation supplied to the field-magnet winding of the converter by the rectifier 25 will promptly cause a reversal of the polarity of the direct-current voltage, the winding 29 remaining deenergized until the polarity reversal is effected.

When a sufficient portion of the secondary voltage across the transformer 21 has been shifted to the winding of relay 26, the latter operates to close a contact 26a in the circuit of the closing coil 14' of the running switch 14 and to open a contact 26b in the circuit of the coil 13' of the starting switch 13. The starting switch 13 is thus opened as a result of the deenergization of the closing coil 13' thereof, and the back contact 13c in the circuit of the closing coil 14' of the running switch 14 is closed. When the circuit of the closing coil 14' is completed through a normally closed contact 24, as a result of the operations described above, the contact 23d having been closed by the operation of the relay 23, the switch 14 is closed to connect the converter directly to the full-voltage terminals of the transformers 12. An auxiliary contact 14a simultaneously completes a locking circuit for the closing coil 14'. The contact 24 may be opened by any protective or manual stopping device to deenergize the closing coil 14' and so to disconnect the converter from its source of energy when the certain conditions obtain. The opening of contact 14c deenergizes relay 23 and thus disconnects the rectifier 25, upon the transfer of the converter armature from starting to running voltage.

The converter is now connected to a source of normal voltage, is running at synchronous speed and has developed the proper polarity. It may now be connected to the direct-current circuit 15 by closing the switch 16. This switch may be automatically closed in response to any desired condition, although it is shown herein as a manual switch for the sake of simplicity.

Figure 4:
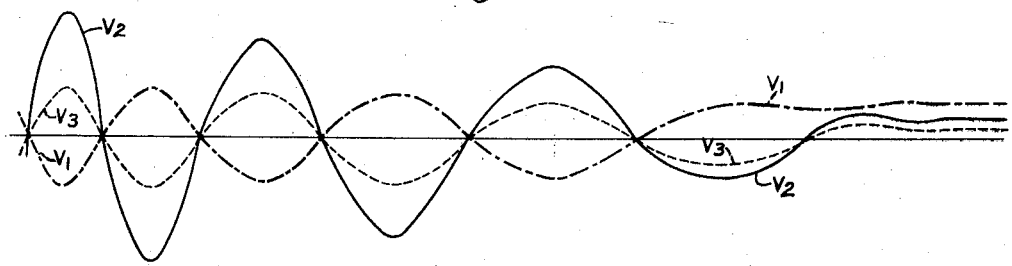
Fig. 4 is a curve diagram illustrating the variation of the induced voltages as the converter accelerates to synchronous speed.

Although it is believed that the principle of the operation of my invention will be apparent from the foregoing, a brief summary thereof will be given in connection with the curves illustrated in Fig. 4, in which the curve $V_1$ illustrates the voltage induced in the armature of the converter toward the close of the starting period. Curve $V_2$ illustrates the voltage induced in the field-magnet winding 17 during starting, and, as explained above, is of greater magnitude than, and is opposite in phase to, the voltage $V_1$ because of the transformer action which induces the voltage. The curve $V_3$ illustrates that portion of the voltage $V_2$ which is applied to the winding 22' of the relay 22.

It will be observed that all of the voltages $V_1$, $V_2$ and $V_3$ are of increasing wave length and that, finally, they all become uniform in one direction. It will also be obvious that the voltage $V_1$ induced in the armature winding is of a substantially constant maximum value while the voltage $V_2$ induced in the field-magnet winding gradually decreases and finally becomes a uniform voltage which is a portion of that induced in the armature winding, since the field-magnet-winding circuit is permanently connected to the converter brushes. This results from the acceleration of the converter armature to the same electrical speed as that of the rotating field created thereby, so that there is no relative movement between the field produced by the converter armature and the field-magnet windings thereof. It will be clear from Fig. 4 that, so long as the converter rotates below synchronous speed, the voltages applied to the windings 22′ and 22″ of the relay 22 ($V_3$ and $V_1$, respectively,) are approximately equal and opposite so that the relay remains inoperative. When synchronous speed is reached, however, voltage $V_3$ falls to quite a low value and becomes of the same polarity as voltage $V_1$ while the winding 22″ is connected directly across the brushes and continues to be energized by the voltage $V_1$. The sum of the fluxes produced by the voltages $V_1$ and $V_3$ after synchronism is attained, is sufficient to operate the relay 22.

It is to be noted that the voltages $V_2$ and $V_3$ do not finally decrease to zero until the voltage $V_1$ has become uni-directional. This insures that the relay 22 will not operate to cause the connection of the rectifier 25 or the transfer from starting to running voltage until the converter has definitely developed one polarity or the other.

The numerous advantages inherent in the system of my invention will be readily apparent to those skilled in the art. The principal of these is that I provide an accurate as well as a positive synchronous-speed relay, which effectively prevents the application of the biasing excitation or the transfer from starting to running voltage until the converter has attained synchronous speed. Another is that the relay which controls the application of biasing excitation and the transfer from starting to running voltage, is not dependent upon the voltage across the converter armature for its energization and, therefore, is not deenergized when the converter voltage decreases to zero during the pole-slipping process. Other advantages will be apparent without further discussion.

Although I have shown and described but a single embodiment of my invention, it is obvious that it is susceptible to changes and alterations, such as will occur to those familiar with such systems. For this reason, I do not wish to be limited to the details of the embodiment illustrated except as necessitated by the appended claims.

I claim as my invention:

1. In a starting system for a synchronous converter comprising a starting switch for connecting the armature winding of the converter to a low-voltage source of current, means for closing said starting switch, a source of biasing excitation current of predetermined polarity for the field-magnet winding of the converter, and means for connecting said source to said winding including a two-winding relay having one winding connected across the converter commutator and the other across a portion of the circuit of the converter field-magnet winding.

2. A starting system for a rotary converter having a field-magnet winding, including a source of starting voltage and means for connecting the converter armature winding thereto, a source of polarizing current for biasing the field-magnet winding, and a two-winding relay for connecting said polarizing source to the field-magnet winding, one of the windings of said relay being connected across the direct-current terminals of the converter and the other across a portion of the field-magnet winding circuit.

3. In a starting system for an alternating-current machine having a field-magnet winding and direct-current armature terminals, means for supplying starting current at low voltage to said machine, a source of excitation current of predetermined polarity for said field-magnet winding, and means for controlling the connection of said source to said winding comprising a relay jointly responsive to the voltages across a portion of the circuit of said winding and across the direct-current armature terminals of the machine.

4. The method of automatically controlling the connection of a separate excitation source to the field-magnet winding of a rotary converter which consists in balancing the voltage induced in the armature winding against a portion of that induced in the field-magnet winding, and effecting said connection when the voltage induced in the field-magnet winding decreases substantially to zero and the voltage induced in the armature winding reaches a steady value of a definite polarity.

5. In a starting system for a translating device having an armature winding provided with alternating-current and direct-current terminals, a field-magnet winding and a source of uni-directional excitation current therefor, a source of alternating-current power, means for connecting the armature winding to the power source, and means responsive to the reversal of the voltage across the field-magnet winding with respect to that across the armature when the device reaches synchronous speed and the voltage induced in the field-magnet winding decreases to zero, for controlling the supply of uni-directional excitation current to the field-magnet winding to cause the translating device to develop a direct-current voltage of predetermined polarity at the direct-current armature terminals.

6. In a starting system for a rotary converter provided with armature and field windings, in combination, means for connecting the armature winding to a low-voltage alternating current source to start the converter, said field winding being connected across the direct-current terminals of the armature, a rectifier, and means for connecting the rectifier to the alternating-current source and to the field winding to supply a uni-directional biasing current to the field winding when the converter reaches synchronous speed, said means including a synchronism-detector relay having actuating windings connected across the direct-current armature terminals of the converter and a portion of the field circuit, respectively.

7. In a starting system for a rotary converter provided with a shunt-field winding, in combination, means for supplying starting voltage to the alternating-current terminals of the converter, said shunt-field winding being connected across the direct-current terminals of the converter in series with a field resistor, a source of direct current, and synchronism-detector means operable to connect the source of direct current across the field winding in response to predetermined changes in the character of the voltage across the direct-current terminals and a portion of the field circuit of the converter when synchronous speed is reached, thereby to cause the converter to develop a predetermined polarity at the direct-current terminals.

8. In a starting system for a rotary converter provided with shunt-field windings, in combination, means for connecting the alternating-current terminals of the converter to a low-voltage starting source, said shunt-field winding being connected across the direct-current terminals of the converter, a source of uni-directional biasing current for the field winding, and synchronism-detector means for controlling the application of biasing current to the field winding to cause the converter to develop a predetermined polarity, said means being rendered ineffective by the out-of-phase voltages induced in the armature and field windings while the converter operates below synchronous speed and effective to apply the biasing current when the induced field current is reduced to zero value and the armature voltage across the direct-current terminals becomes uni-directional.

9. In a starting system for a rotary converter provided with a shunt-field winding, in combination, a source of high and low-voltage power, means for connecting the alternating-current terminals of the converter to the low-voltage power source for starting the converter, a field rheostat, said field winding being connected across the direct-current terminals of the converter in series with the field rheostat, a source of uni-directional excitation current, a relay operable to connect the field winding across said current source, said relay being provided with actuating coils differentially energized by the alternating voltages induced in the armature and field circuits of the converter when it is operating below synchronous speed and responsive to the cumulative affect of said voltages when synchronous speed is reached to energize the field winding from the uni-directional excitation source to cause the converter to develop the desired polarity across the direct-current terminals.

10. In a starting system for a rotary converter provided with a field winding, in combination, a source of alternating current for the converter, means for connecting the alternating-current terminals of the converter to the source of alternating current, said field winding being connected across the direct-current terminals of the converter armature, a resistor connected in series with the field winding, a source of uni-directional current, and means responsive to the sum of the uni-directional voltages across the direct-current terminals of the converter and across a predetermined portion of the field resistor when synchronous speed is reached for connecting the uni-directional current source across the field winding, thereby to cause the converter to develop a predetermined polarity before the alternating-curent terminals are connected to the running voltage.

11. In a starting system for a rotary converter provided with a shunt-field winding, in combination, a source of alternating-current power, electro-responsive starting and running switches for establishing starting and running connections to the source of alternating-current supply, means for effecting the operation of the starting switch to initially energize the coverter, said shunt-field winding being connected across the direct-current terminals of the converter, a rectifier connected across the alternating-current power source to provide a source of uni-directional current, a synchronism-detector relay jointly responsive to the uni-directional voltage across the direct-current terminals of the converter and the uni-directional voltage across a portion of the field circuit when the converter reaches synchronous speed for connecting the direct-current output terminals of the rectifier across the field winding to cause the converter to develop a predetermined polarity, and means responsive to a predetermined value of direct-current terminal voltage for effecting the opening of the starting switch and the closure of the running switch to establish running connections and render the rectifier ineffective to further supply biasing current to the field winding.

In testimony whereof, I have hereunto subscribed my name this twenty-fourth day of April, 1929.

GEORGE MAHER.